US012754123B2

(12) United States Patent
Kimmerling et al.

(10) Patent No.: US 12,754,123 B2
(45) **Date of Patent: *Oct. 6, 2026**

(54) ASSESSING IMMUNE SYSTEM FUNCTION AND STATUS

(71) Applicant: Travera, Inc., Medford, MA (US)

(72) Inventors: Robert Kimmerling, Cambridge, MA (US); Selim Olcum, Cambridge, MA (US); Mark Stevens, Cambridge, MA (US); Anthony Minnah, Weymouth, MA (US); Madeleine Vacha, Watertown, MA (US)

(73) Assignee: Travera, Inc., Medford, MA (US)

( * ) Notice: Subject to any disclaimer, the term of this patent is extended or adjusted under 35 U.S.C. 154(b) by 916 days.

This patent is subject to a terminal disclaimer.

(21) Appl. No.: 17/977,341

(22) Filed: Oct. 31, 2022

(65) Prior Publication Data

US 2023/0165956 A1 Jun. 1, 2023

Related U.S. Application Data

(60) Provisional application No. 63/274,226, filed on Nov. 1, 2021.

(51) Int. Cl.
*G01N 15/10* (2024.01)

(52) U.S. Cl.
CPC . *G01N 15/1023* (2024.01); *G01N 2015/1021* (2024.01)

(58) Field of Classification Search
CPC ........................ G01N 2015/1021; A61K 40/31
See application file for complete search history.

(56) References Cited

U.S. PATENT DOCUMENTS

| | | | |
|---|---|---|---|
| 8,418,535 B2 | 4/2013 | Manalis et al. | |
| 9,132,294 B2 | 9/2015 | Zheng et al. | |
| 2020/0011868 A1 | 1/2020 | Niazi et al. | |
| 2021/0025894 A1* | 1/2021 | Darowski ........ | G01N 33/57484 |

FOREIGN PATENT DOCUMENTS

| | | | |
|---|---|---|---|
| WO | 2014/190303 A1 | 11/2014 | |

OTHER PUBLICATIONS

Cermak, Nathan, et al. "High-throughput measurement of single-cell growth rates using serial microfluidic mass sensor arrays." Nature biotechnology 34.10 (2016): 1052-1059. (Year: 2016).*
Frey, Noelle, and David Porter. "Cytokine release syndrome with chimeric antigen receptor T cell therapy." Biology of Blood and Marrow Transplantation 25.4 (2019): e123-e127. (Year: 2019).*
Burg et al.: "Weighing of biomolecules, single cells and single nanoparticles in fluid", Nature, (2007), vol. 446, pp. 1066-1069.
Cermak et al.: "High-throughput measurement of single-cell growth rates using serial microfluidic mass sensor arrays", Naure Biotechnology, (2016), vol. 34, No. 10, pp. 1052-1059.
Lee et al.: "Suspended microchannel resonators with piezoresistive sensors", Lab on a Chip, (2011), vol. 11, p. 645.
Martinelli et al.: "The application of Complement Fixation to Antibody Weight Estimates. I. To Soluble Antigens", Journal of Immunological Methods, (1978), vol. 22, pp. 175-190.
Semenova et al.: "Mass Value Assignment of Total and Subclass Immunoglobulin G in a Human Standard Anthrax Reference Serum", Clinical and Diagnostic Laboratory Immunology, (2004), vol. 11, No. 5, pp. 919-923.

* cited by examiner

*Primary Examiner* — Robert J Yamasaki
(74) *Attorney, Agent, or Firm* — Thomas C. Meyers; Sullivan & Worcester LLP

(57) ABSTRACT

The invention provides methods for assessing immune system function and status based on cellular analysis. Methods of the present invention involve obtaining mass properties of immune cells collected in a tissue or body fluid sample from a subject. Such mass properties may include the mass of one or more immune cells and/or changes in mass of such immune cells over a period of time. Such data is then used for determining a status of the subject's immune response, and subsequent diagnosis and treatment of an infection or immunological disease or dysfunction.

4 Claims, 13 Drawing Sheets

ASSESSING IMMUNE SYSTEM FUNCTION AND STATUS

TECHNICAL FIELD

The invention relates to methods of assessing immune system function and status for subsequent diagnosis and treatment of disease.

BACKGROUND

Diseases and disorders of the immune system are a significant cause of morbidity and mortality. A well-functioning immune response protects against severe disease, shortens the course of a disease, and may be important for optimal effectiveness of therapeutics. There are numerous reasons the immune system may fail to function. For example, the immune system may underreact (i.e., fail to adequately respond to a foreign body) or overreact (i.e., react to a foreign body that is normally harmless), such as the case with allergic reactions to dust, mold, pollen, and certain foods, for example. In addition, autoimmune diseases provide examples in which the immune system attacks normal, heathy tissues.

The immune system is made up by a large number of immune cell types that work together in a coordinated manner to produce the right immune response to a foreign body (e.g., an invading pathogen or an internal disease like cancer). Accordingly, when attempting to determine the cause of disease and/or an effective course of treatment, it is helpful to assess the status of the immune system. Moreover, immune system activity provides insight into the selection of therapeutics.

SUMMARY

This invention provides methods for assessing immune system function and status. In particular, the present invention recognizes that certain biomarker measurements of immune cells, including mass measurements and others, are useful as a label-free biomarkers for characterizing immune cell function, response to treatment, and therapeutic efficacy. Methods of the present invention involve obtaining mass properties of immune cells collected in a tissue or body fluid sample. Mass properties may include the mass of one or more immune cells and/or changes in mass of immune cells over a period of time. These mass measurements can be linked with additional orthogonal measurements collected for the same single cells including cell diameter, cell volume, cellular electrical properties (impedance, capacitance, resistance), optical properties (brightfield imaging, fluorescence, morphological feature extraction), cell density, cell stiffness, cell deformation, or cell surface friction. Data are then used for determining immune response, and informing subsequent diagnosis and treatment of an infection or immunological disease or dysfunction.

In one example, mass properties of immune cells are used as tools for analyzing immune status. The immune system responds to stimuli by activating pathways that release proteins, biochemical messengers, and other cellular components to fight infection or foreign particles. The activation of the immune system is detected by, for example, increased production of components of the immune system. In some instances, if an immune cell has been activated, it may start to produce immunoglobulins, cytokines, and/or histamine or other inflammatory cascade participants. Methods of the present invention detect the production and release of those biochemical markers by detecting a change in the mass, volume or other changes in the immune cells, for example. In response to stimulation, immune cells quickly under to metabolic state and phenotypic changes. The magnitude and kinetics of these biophysical changes provide a complimentary method of characterizing immune cell function/dysfunction and response to therapies.

In one embodiment, methods of the present invention detect, with very high sensitivity, the mass of an immune cell by using a measurement instrument, such as, for example, a suspended microchannel resonator (SMR) measurement instrument. Additional linked single-cell measurements may also be collected to complement these single-cell mass measurements. A tissue or body fluid sample derived from a subject is prepared and loaded into the SMR instrument, in which the sample flows through the SMR. The SMR may be used to precisely measure biophysical or phenotypic properties, such as mass and mass changes, of a single immune cell flowing therethrough. Within the same instrument, additional single-cell measurements (a range of which are described above) may also be collected and linked with each single-cell mass measurement. By using this technique to determine a mass property of immune cells, the invention allows assessment of a subject's immune status (i.e., a determination of whether the immune system is actively attempting to respond to a stimulus).

In some instances, the subject may have a known stimulus and an investigator can determine whether an appropriate immune response is occurring. In other instances, the subject may be exhibiting symptoms requiring differential diagnosis, and the invention is useful to determine whether those symptoms are being caused by immunological activity. In other instances, the subject may not be exhibiting symptoms of immunological activity, but a known stimulus should have elicited such a response, and the invention might be used to determine whether immunological activity is taking place, though the subject may not be able to feel such effects.

In one embodiment, methods of the present invention identify immune system function or dysfunction based on clinical data patterns predictive of immune-based diseases. In particular, clinical data from across a population are provided as input to a machine learning system. The clinical data include a training data set, which includes biomarker measurements (e.g., mass measurements) of immune cells collected from a plurality of patient samples, each having a known healthcare status (i.e., immunological function or disease and dysfunction). The machine learning system discovers associations in the training data and correlates healthcare status to biomarker measurement results. In particular, the machine learning system processes the training data set and discovers latent patterns that are predictive of an immunological status, including a stage or progression of a particular immunological disease or dysfunction, as well as treatments that are effective and ineffective. After repeatedly finding associations among data (i.e., immune cell mass measurements) across the population, the machine learning system learns the association and its correlation to healthcare status.

Accordingly, methods of the present invention are useful in determining immune system function and status. In one example, a machine learning system receives patient data from an individual and identifies an immunological function or dysfunction for the individual when the patient data presents one or more of the discovered associations. In particular, the patient data may include mass measurements and other single-cell data of immune cells derived from a patient sample. Upon detecting that association among the patient data for the individual, the machine learning system further generates a report providing information related to the immune system evaluation, including, but not limited to, specific data associated with the patient sample having undergone testing, whether the patient's immune system is active or inactive, a determination of whether the patient's immune system is functional or dysfunctional, and a customized treatment plan tailored to an individual patient's immune system evaluation. The report may further provide predictive information, such as a prediction of risk of developing an immunological dysfunction.

In addition to assessing immune system response for subsequent diagnosis and treatment of a disease, methods of the present invention are useful in identifying drug candidates and establishing vaccine efficacy. For example, in some embodiments, methods of the present invention are used to monitoring a patient's response to a stimulus (i.e., a drug, therapeutic, or vaccine), in which mass change in immune cells post-administration of the stimulus is used in to determine efficacy of the stimulus.

In addition to direct measurements of immune cells, mass measurements, possibly in combination with additional linked single-cell data sets, can be used to monitor the effect of immune cells on target cells. For example, in some embodiments, methods of the present invention are used to monitor the targeted cell killing by immune cells including antibody dependent cellular cytotoxicity (ADCC) by natural killer cells or T-cell mediated cytotoxicity (by naturally occurring T cells or CAR-T cells). To perform this assessment, mass measurements are collected for a cell sample consisting of both immune cells and target cells (e.g., tumor cells). This sample is then treated with an immune-mediated drug, such as a therapeutic antibody, and after allowing time for the corresponding immune activity to occur, additional mass measurements are collected for treated and untreated portions of the sample to determine if there are any differences between mass distribution that would indicate efficacy of immune-dependent therapy. In some cases, additional exogenous immune effector components may also be added to the specimen to assess therapeutic efficacy. For example, in addition to a therapeutic antibody, exogenous natural killer cells may also be added to a cell sample as a means of testing therapeutic efficacy.

DETAILED DESCRIPTION

The invention provides systems and methods for assessing immune system function and status based on cellular and molecular analysis. The present invention recognizes that certain biomarker measurements of immune cells, including mass and other measurements, are useful as label-free biomarkers for characterizing immune cell function and response to treatment. Methods of the present invention involve obtaining properties of immune cells collected in a tissue or body fluid sample. Such properties may include the mass of one or more immune cells and/or changes in mass of such immune cells over a period of time. Such data are then used for determining a status of the subject's immune response, and subsequent diagnosis and treatment of an infection or immunological disease or dysfunction.

Mass and related properties of immune cells are useful tools for analyzing whether a subject's immune system has been activated. The immune system responds to stimuli by activating pathways that release proteins, biochemical messengers, and other cellular components to fight infection or foreign particles. The cells' activation can be detected by their production of these components of the immune system. In some instances, if an immune cell has been activated, it may start to produce immunoglobulins, cytokines, and/or histamine or other inflammatory cascade participants. Methods of the present invention detect the production and release of such biochemical markers by detecting a change in the mass of immune cells, for example. In response to stimulation, immune cells quickly change metabolic state and ultimately their mass. The magnitude and kinetics of these biophysical changes provide a complimentary method of characterizing immune cell function/dysfunction and response to therapies.

As described in greater detail herein, in one embodiment, methods of the present invention detect, with very high sensitivity, the precise mass of an immune cell by using a biomarker measurement instrument, such as, for example, a suspended microchannel resonator (SMR) measurement instrument. A tissue or body fluid sample derived from a subject is prepared and loaded into the SMR instrument, in which the sample flows through the SMR. The SMR may be used to precisely measure biophysical properties, such as mass and mass changes, of a single immune cell flowing therethrough. By using this technique to determine mass properties of immune cells, the invention allows assessment of a subject's immune status (i.e., a determination of whether the immune system is actively trying to respond to a stimulus).

Figure 1:
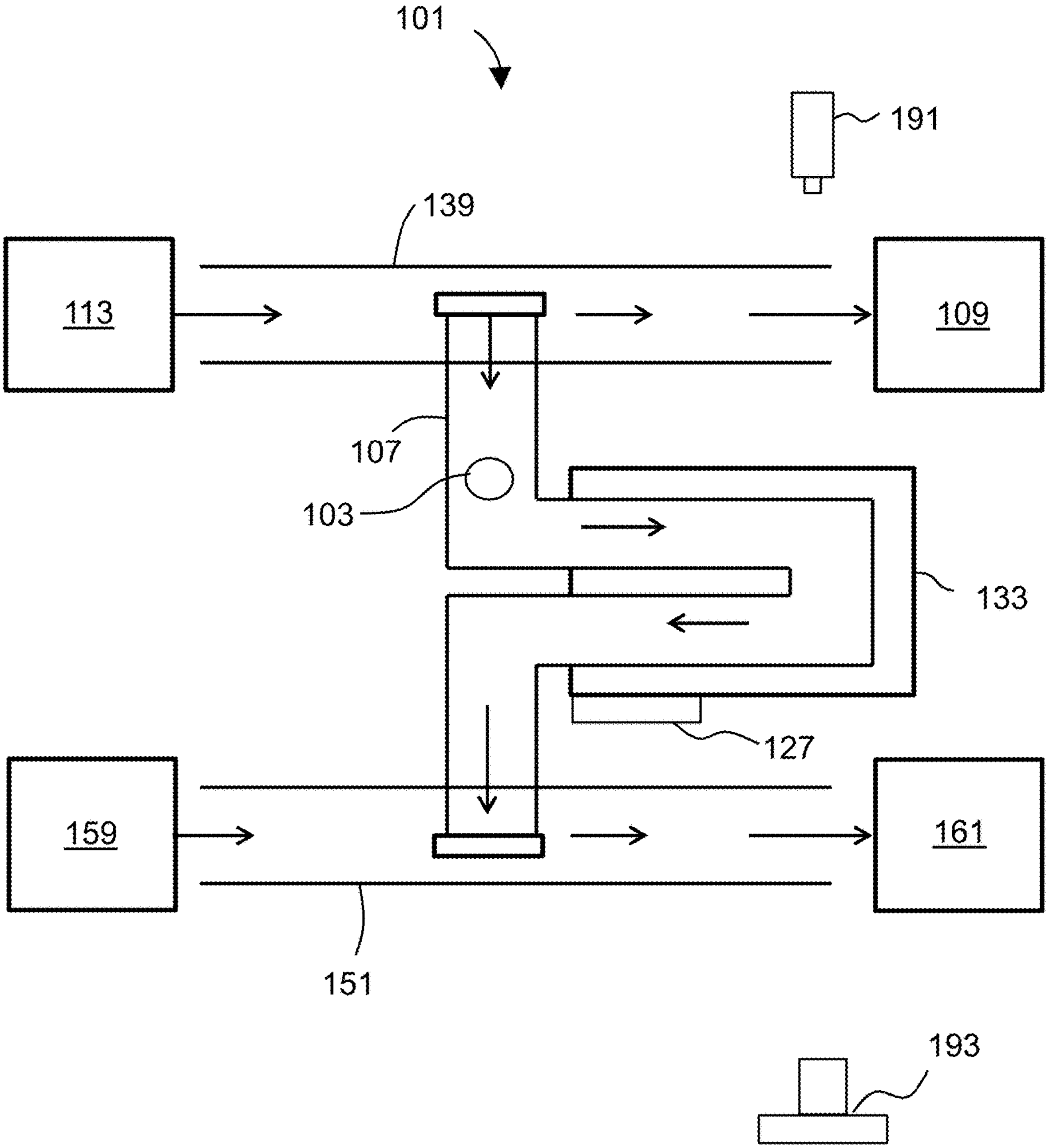
FIG. 1 shows a schematic of a suspended microchannel resonator (SMR) device.
Figure 2:
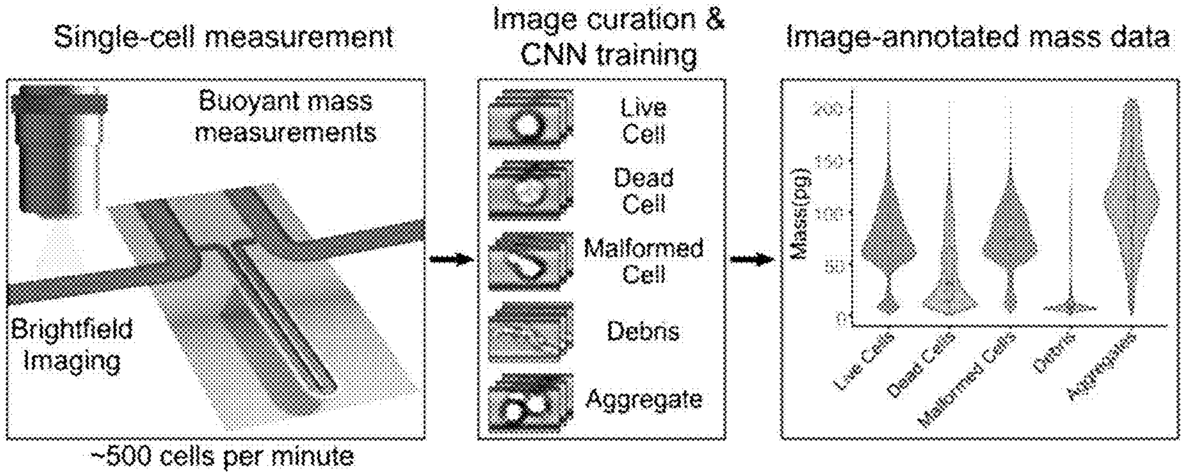
FIG. 2 shows a system of the invention, including the SMR device.

FIG. 1 shows an exemplary SMR device 101 used in the methods, devices, and systems of the invention. FIG. 2 shows a system of the invention, including the SMR device 101. The SMR can be used to measure biophysical properties with extreme precision. Cells are flowed through the structure, which is resonated, and its frequency of resonation is measured. The frequency at which a structure resonates is dependent on its mass. By measuring the frequency at which the cantilever resonates, the instrument computes a mass, or change in mass, of a cell or sample in the fluidic microchannel. By flowing individual cells from the tissue samples through such devices, functions of the cell can be observed, such as whether the cells are growing or accumulating or losing mass.

Accordingly, the SMR measures mass and mass changes of a single cell flowing through it. The SMR comprises an exquisitely sensitive scale that measures small changes in mass of a single cell. For the purposes of the invention, the SMR can detect a minor weight change resulting from the activation or deactivation of some part of the immune system, immune cascades, or of a disease or disorder of the immune system.

The SMR device 101 includes a microchannel 107 that runs through a cantilever 133 that is suspended between an upper bypass channel 139 and a lower bypass channel 151. Two bypass channels allow for decreased flow resistance and accommodates the flow rate through the micro channel. The sample inflows 113 through the upper bypass channel 139, where in a portion of the fluid collects in the upper bypass channel waste reservoir 109. A portion of the fluid including at least one cell or component flows through the suspended microchannel 107. The flow rate through the suspended microchannel is determined by the pressure difference between its inlet and outlet period. Since the flow cross section of the suspended microchannel is about 70 times smaller than that of the bypass channels, the linear flow rate can be much faster in the suspended microchannel than in the bypass channel. The SMR is measuring the fluid that is present at the inlet of the suspended microchannel 107.

The fluid-suspended sample 103 flows through the suspended microchannel. The suspended microchannel extends through a cantilever 133 which sits between a light source 191 and a photodetector connected to a chip 193 such as a field programmable gate array. The cantilever is operated on by an actuator or resonator 127. The resonator may be a piezoceramic actuator seated underneath the cantilever for actuation. The sample flows from the upper bypass channel 139 to the inlet of the suspended microchannel, through the suspended microchannel, and to the outlet of the suspended microchannel toward the lower bypass channel 151. A buffer 159 flows through the lower bypass channel towards a lower bypass channel collection reservoir 161. After the cell is introduced to the lower bypass channel, the cell is collected in the lower bypass collection reservoir.

After flowing the live cells or components through the SMR, the mass properties are measured by the instrument. Individual cells or components can pass through the SMR, and each cell or component can be weighed multiple times over a defined interval. The SMR may include multiple sensors that are fluidly connected, such as in series, and separated by delay channels. Such a design enables a stream of cells to flow through the SMR such that different sensors can concurrently way flowing cells in the stream, revealing single cell mass properties. The SMR device provides real-time high throughput monitoring of mass properties or mass changes for the cells flowing there through. The mass properties of the cell or components can be measured then the data can be stored and used in subsequent analysis steps. The SMR 101 may be used to precisely measure biophysical properties, such as mass and mass changes, of a single cell flowing therethrough. The mass change may be mass accumulation rate (MAR).

Exemplary suspended microchannel resonator devices 101 include those as described in Cermak, 2016, High-throughput measurement of single-cell growth rates using serial microfluidic mass sensor arrays, *Nat Biotechnol,* 34(10):1052-1059, which is incorporated by reference. Various embodiments of SMR devices 101 and as well as methods of use, include those instruments/devices manufactured by Innovative Micro Technology (Santa Barbara, CA) and as described in U.S. Pat. Nos. 8,418,535 and 9,132,294, which are all incorporated by reference.

The cantilever of the SMR device 101 may be housed in an on-chip vacuum cavity, reducing damping and improving frequency (and thus mass) resolution for optimized measurements. As a cell flows through the interior of the cantilever, it transiently changes the resonant frequency of the cantilever in proportion to the buoyant mass of the cell. The SMR device 101 may weigh single mammalian cells with a resolution of 0.05 pg (0.1% of a cell's buoyant mass) or better. Measurements may occur quickly, allowing the SMR to obtain mass distribution(s) for hundreds of living cells a minute.

The SMR device 101 may be fabricated as described in Lee, 2011, Suspended microchannel resonators, Lab Chip 11:645 and/or Burg, 2007, Weighing of biomolecules, *Nature* 446:1066-1069, which are incorporated by reference. Large-channel devices (e.g., useful for peripheral blood mononuclear cells (PBMC) measurements) may have cantilever 133 interior channels of 15 by 20 μm in cross-section, and bypass channels 20 by 30 μm in cross-section. Small-channel devices (useful for a wide variety of cell types) may have cantilever 133 channels 3 by 5 μm in cross-section, and bypass channels 4 by 15 μm in cross-section. The tip of the cantilever 133 in may be aligned so that a single line-shaped laser beam can be used for optical-lever readout.

In certain aspects, before using the SMR for measuring cellular mass, the SMR device may be cleaned with piranha (3:1 sulfuric acid to 50% hydrogen peroxide) and the channel walls may be passivated with polyethylene glycol (PEG) grafted onto poly-L-lysine. In some embodiments, a piezo-ceramic actuator seated underneath the device is used for actuation. The SMR device 101 may include low-noise photodetector, Wheatstone bridge-based amplifier (for piezo-resistor readout), and high-current piezo-ceramic driver. To avoid the effects of optical interference, the instrument may include a low-coherence-length light source (675 nm super-luminescent diode, 7 nm full-width half maximum spectral width) as an optical lever. After the custom photodetector converts the optical signal to a voltage signal, that signal is fed into an FPGA board, in which an FPGA implements parallel second-order phase-locked loop(s) which both demodulates and drives the cantilever. The FPGA may be a Cyclone IV FPGA on a DE2-115 development board operating on a 100 MHz clock with I/O provided via a high-speed AD/DA card operating 14-bit analog-to-digital and digital-to-analog converters at 100 MHz.

To operate the cantilever 133 in the SMR device to measure a cell's mass, the resonator transfer function is first measured by sweeping the driving frequency and recording the amplitude and phase of the SMR's response. Parameters for the phase-locked loop (PLL) is calculated such that the cantilever-PLL feedback loop has a 50 or 100 Hz FM-signal bandwidth. The phase-delay for the PLL may be adjusted to maximize the cantilever vibration amplitude. The FM-signal transfer function may be measured for the cantilever-PLL feedback loop to confirm sufficient measurement bandwidth (in case of errors in setting the parameters). That transfer function relates the measured cantilever-PLL oscillation frequency to the cantilever's time-dependent intrinsic resonant frequency. Frequency data for the cantilever may be collected at 500 Hz, and may be transmitted from the FPGA to a computer. The device may be placed on a copper heat sink/source connected to a heated water bath, maintained at 37 degrees C.

Cells may be loaded into the device from vials pressurized under air or air with 5% CO2 through 0.009 inch inner-diameter fluorinated ethylene propylene (FEP) tubing. Alternatively, cells may be loaded into the device using syringe pump driven flow. The sample may include treated and/or untreated cells from a sample. In certain aspects, treated and untreated cells are introduced into the device together. Alternatively, treated and untreated cells may be introduced into the device separately. The pressurized vials may be seated in a temperature-controlled sample-holder throughout the measurement. FEP tubing allows the device to be flushed with piranha solution for cleaning, as piranha will damage most non-fluorinated plastics. To measure a sample of cells, the SMR may be initially flushed with filtered media.

On large-channel devices, between one and two psi may be applied to the device, yielding flow rates on the order of 0.5 nL/s (the device's calculated fluidic resistance is approximately 3×10^16 Pa/(m3/s). For small-channel devices, 4-5 psi may be applied to the device, yielding flow rates around 0.1 nL/s. In certain aspects, new sample may be periodically flushed into the input bypass channel to prevent particles and cells from settling in the tubing and device. Between experiments, devices may be cleaned with filtered 10% bleach or piranha solution.

Precision frequency detection following identification of particles by a classifier allows the SMR device 101 to measure resonant frequency and mass in single living cells that flow through the device. Precision is the closeness of agreement between independent test results. When determining SMR resonance frequency optically, devices of the invention may use an external laser and photodiode. Alternatively, electronic detection of SMR resonance frequency may be attained by fabricating piezo-resistive sensors using ion implantation into single crystal silicon resonators. The mass resolution achieved with piezo-resistive detection, such as 3.4 femtogram (fg) in a 1 kHz bandwidth, is comparable to what can be achieved by a conventional optical detector designed to weigh micron-sized particles and cells. The use of an SMR device 101 eliminates the need for expensive, delicate optical components and provides new uses for the SMR device 101 in high throughput and field deployable applications. For example, piezo-resistive sensors eliminate the need for external components by measuring deflection through the resistance change of a sensing element integrated onto the cantilever. Microfluidic channels are incorporated inside a cantilever resonator, which significantly reduces viscous damping from fluid and allows buoyant mass to be measured with high resolution.

Upon passing through the instrument 101, single cells remain viable. The cells can be isolated downstream from the instrument and are available to undergo subsequent assays. Cells can be collected in a suitable container an available to undergo a second assay.

Figure 3:
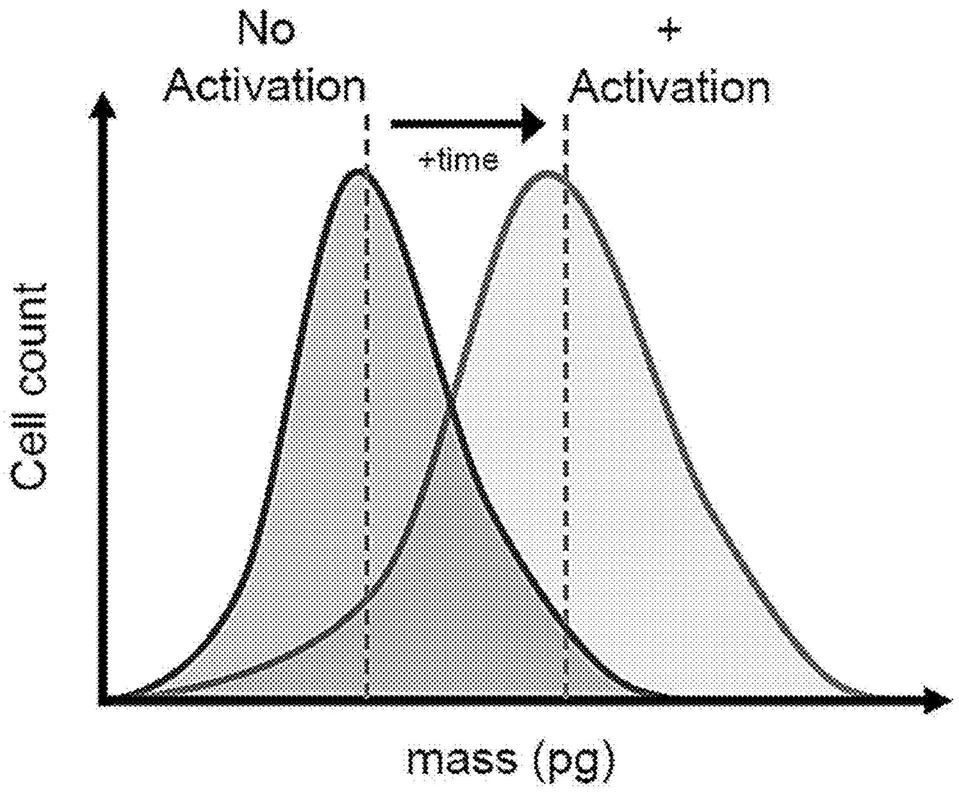
FIG. 3 shows a graph illustrating cell mass as a result of immune activation.

FIG. 3 shows a graph illustrating cell mass as a result of immune activation. As previously described, as a highly integrative measure of cell state, mass can be used as a label-free biomarker for characterizing immune cell function. In particular, in response to stimulation, immune cells can quickly change metabolic state and ultimately, change their mass. The magnitude and kinetics of these biophysical changes provide a complimentary method of characterizing immune cell dysfunction (e.g., T cell exhaustion) and response to therapies (e.g., checkpoint inhibitors), as will be described in greater detail herein.

Figure 4:
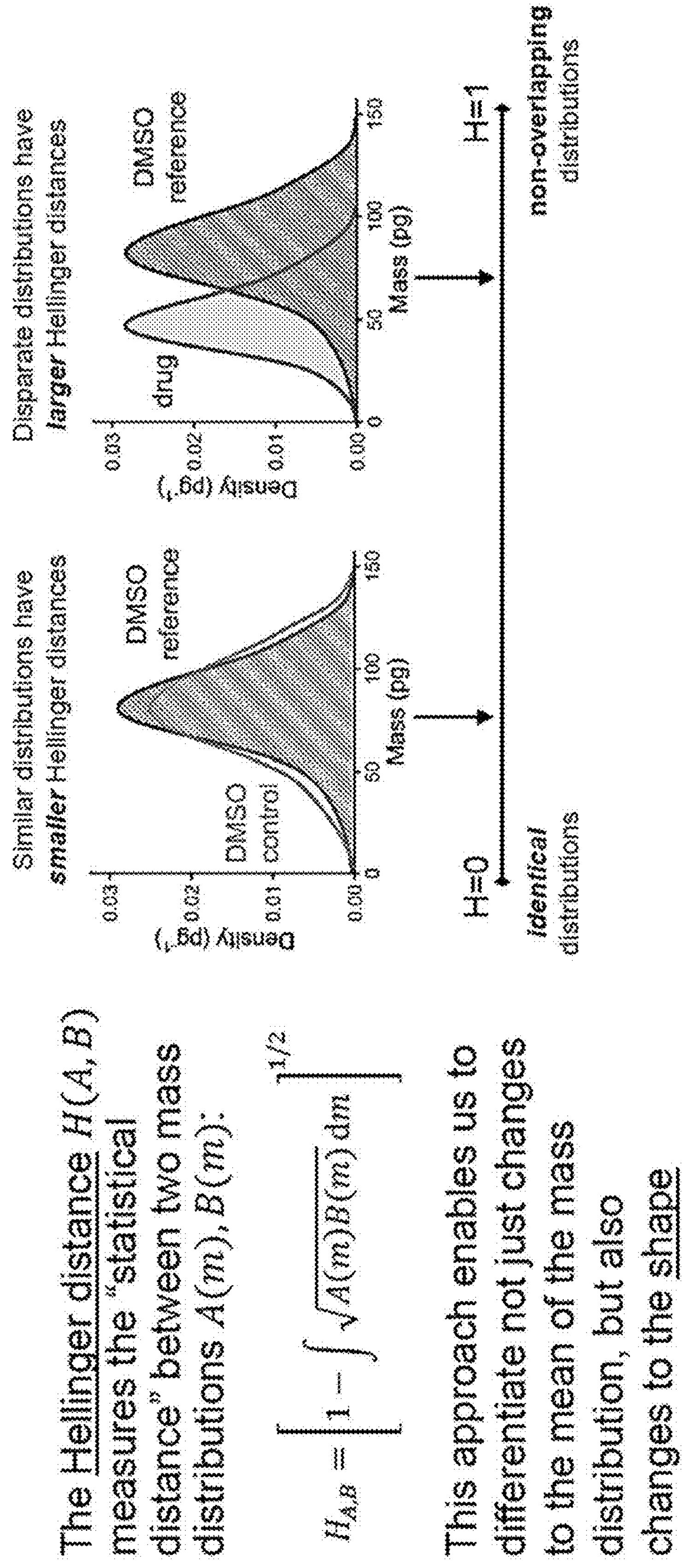
FIG. 4 shows the use of Hellinger distance approach for determining a statistical distance between cellular mass distributions.

FIG. 4 shows exemplary results and analysis using the methods of the invention. The two panels show mass distributions measured using the same SMR between to control cell populations (DMSO) and between a control cell population and that subjected to a treatment modality, in this case, a drug. Differences between the control cell and treatment modality mass distributions are indicative of a cellular response to the drug. These differences may include, for example, the ranges of the mass distributions. Differences indicative of a cellular response may also include differences between the shapes of the distributions, e.g., the magnitudes and widths of peaks in the distributions. As shown in FIG. 4, metrics such as the Hellinger distance, mass normalized Wasserstein distance, etc. may be used to compare the mass distributions of the treated and untreated cells. As such, the present invention is able to provide measures of cellular response to a treatment modality without a calibration step. Further, this approach can be extended to any measurement technology that is performed on a target population and the resulting signal is not absolute but relative to a control population.

Further, under certain circumstances, the present invention may provide measurements equivalent to those obtained using single-cell MAR. Single-cell MAR is the time derivative of cell mass. Therefore, the signal measured is sensitive to the time of measurement. Even when cells are expected to respond to a particular therapy, the time dynamics of cell mass change is difficult to predict. It is particularly difficult for patient samples, where an increased variability is expected compared to cancer cell lines. Comparing the mass of cells in treated and untreated populations after a predetermined dosing interval enables methods of the present invention to measure the time-integral of the MAR signal, independent of the time-dynamics of mass change. The presently disclosed methods are particularly effective if the dosing interval is long enough to capture most of the mass change in the treated cells and when the untreated control cells do not considerably alter their mass due to biological decay. Nevertheless, the present invention includes methods that monitor the natural decay of cells, for example, by using the second set of untreated control cells measured after the treated cells.

In certain aspects, the SMR device used in the methods and systems of the invention with a classifier the directs the flow of cells and/or non-cellular material through the device. As shown in FIG. 2, the device may use a classifier coupled to, for example, a brightfield sensor, to provide additional characterization of cells the flow through the device.

Figure 5:
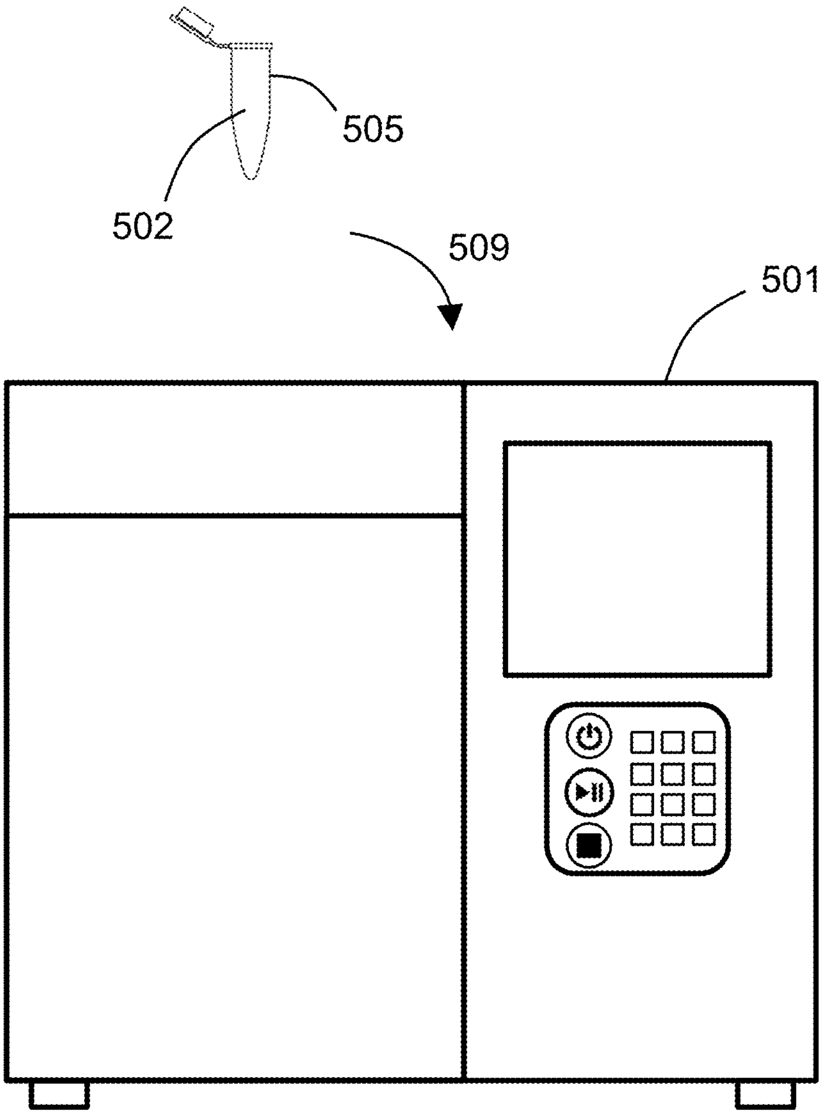
FIG. 5 shows an instrument comprising an SMR device.

FIG. 5 shows an SMR instrument 501 capable used in the methods of the invention. A sample 502 may include treated and/or untreated cells, which may be, for example, immune cells. Samples may be collected and stored in their own container 505, such as a tube or flask such as the 1.5 mL micro-centrifuge tube sold under the trademark EPPENDORF FLEX-TUBES by Eppendorf, Inc. (Enfield, CT). Live cells from the sample 502 are introduced into the SMR instrument 501. After measurement using the SMR, and upon passing through the instrument, single cells may remain viable and can be isolated downstream from the instrument and are available to undergo subsequent assays.

Mass change signals may reveal cellular responses indicative of the efficacy of a particular treatment modality. In certain aspects, immune cells may be obtained from a patient and a portion of them treated with a treatment modality. Treated and untreated cells are introduced into the measurement device of the present invention. Cells may be from a biological sample obtained from a patient by any suitable means. Examples of obtaining the sample include fine needle aspiration, blood draw, and biopsy.

Fine needle aspiration and bone marrow biopsy provide a solid biological sample from the patient, providing the ability to sample from pleural effusions and ascites. Accordingly, the sample does not need to be in liquid form. Solid biological samples, for example from fine needle aspiration, may preferably be disaggregated and/or added to a buffer prior to introduction to the instrument. Accordingly, optimized cellular measurements may be obtained from cells from a tissue sample obtained from a solid tumor and the tumor can be from one selected from the group consisting of a bone, bladder, brain, breast, colon, esophagus, gastrointestinal tract, urinary tract, kidney, liver, lung, nervous system, ovary, pancreas, prostate, retina, skin, stomach, testicles, and uterus of a subject. The methods may be used to obtain tumors or cancers of any suitable type. Methods may include accessing a tumor in a patient via fine needle aspirate to take a biological sample comprising cancer cells, disaggregating the biological sample to isolate at least one living cell. The solid biological sample may then be suspended in a media and introduced to the measurement instrument. Non-limiting examples of media include saline, nutrient broth, and agar medium. Examples of biopsies that may provide cells for optimized cellular measurement using systems and methods described herein can include, needle biopsy, bone biopsy, bone marrow biopsy, liver biopsy, kidney biopsy, aspiration biopsy, prostate biopsy, skin biopsy, or surgical biopsy.

A tissue sample may include a mass of connected cells and/or extracellular matrix material, e.g. skin tissue, hair, nails, nasal passage tissue, CNS tissue, neural tissue, eye tissue, liver tissue, kidney tissue, placental tissue, mammary gland tissue, placental tissue, mammary gland tissue, gastrointestinal tissue, musculoskeletal tissue, genitourinary tissue, bone marrow, and the like, derived from, for example, a human or other mammal and includes the connecting material and the liquid material in association with the cells and/or tissues.

Liquid material derived from, for example, a human or other mammal such as body fluids may also be utilized. Such body fluids include, but are not limited to, mucous, blood, plasma, serum, serum derivatives, bile, blood, maternal blood, phlegm, saliva, sputum, sweat, amniotic fluid, menstrual fluid, mammary fluid, follicular fluid of the ovary, fallopian tube fluid, peritoneal fluid, urine, semen, and cerebrospinal fluid (CSF), such as lumbar or ventricular CS. A sample also may be media containing cells or biological material. A sample may also be a blood clot, for example, a blood clot that has been obtained from whole blood after the serum has been removed. In certain embodiments, the sample is blood, saliva, or semen collected from the subject.

Any suitable sample may be obtained for optimized cellular measurements by the methods and systems of the invention. For example, the sample may include immune cells. The sample may include tissue of any type including healthy tissue or bodily fluid of any type. In some embodiments, the tissue sample is obtained from a pleural effusion in a subject. A pleural effusion is excess fluid that accumulates in the pleural cavity, the fluid-filled space that surrounds the lungs. This excess fluid can impair breathing by limiting the expansion of the lungs. Various kinds of pleural effusion, depending on the nature of the fluid and what caused its entry into the pleural space, may be sampled. A pneumothorax is the accumulation of air in the pleural space, and is commonly called a "collapsed lung". In certain embodiments, the tissue sample is obtained from ascetic fluid in a subject. Ascites is the accumulation of fluid (usually serous fluid which is a pale yellow and clear fluid) that accumulates in the abdominal cavity. The abdominal cavity is located below the chest cavity, separated from it by the diaphragm. The accumulated fluid can have many sources such as liver disease, cancers, congestive heart failure, or kidney failure.

Figure 6:
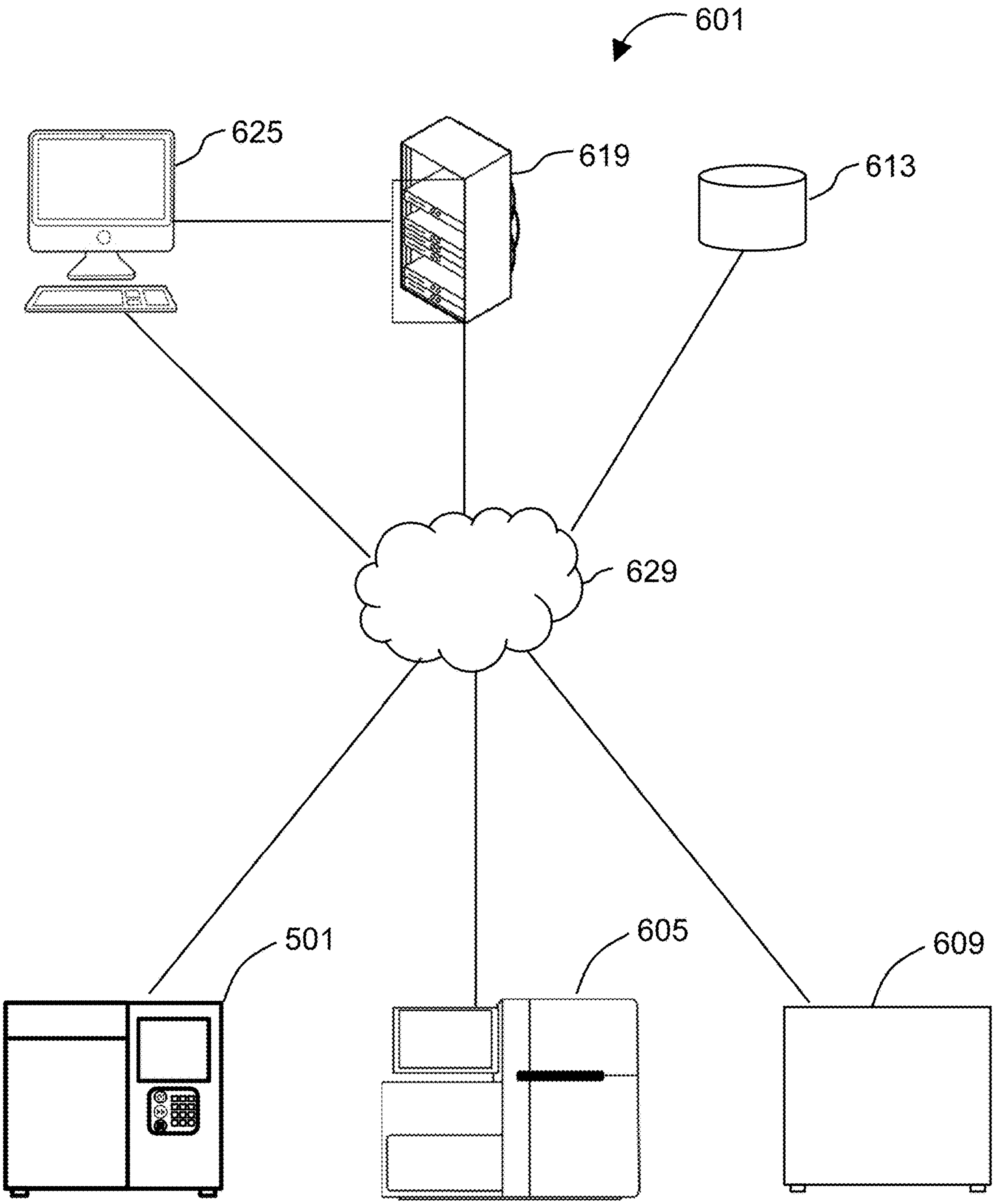
FIG. 6 shows a system of the invention.

FIG. 6 shows an exemplary system 601 useful for performing methods of the disclosure. Preferably, the system provides an SMR instrument 501 capable of making optimized cell measurements and at least one computer 625. The system 601 also preferably includes at least one server 619. The instrument includes a single SMR device used to measure mass properties of cells (preferably immune cells).

The instrument may generally include a classifier. The classifier may operate in real-time, and the identification of cells and/or non-cellular material and may be used to control flow through the instrument 501. Either or both of the computer 625 and the server 619 may include and provide the classifier. The system 601 may optionally also include any one or more of a storage 613, a sequencing instrument 605, and any additional analysis instruments 609 for performing additional assays on the one or more cells downstream of the initial assay performed by instrument 501. Any of those elements may interoperate via a network 629. Any one of the instruments may include its own built-in or connected computer which may connect to the network and/or the server. The instrument 501, for example, may have its own computer or server which provides the classifier. The computer 625 may include one or more processors and memory as well as an input/output mechanism. Where methods of the invention employ a client/server architecture, steps of methods of the invention may be performed using the server, which includes one or more of processors and memory, capable of obtaining data, instructions, etc., or providing results via an interface module or providing results as a file. The server 619 may be provided by a single or multiple computer devices, such as the rack-mounted computers sold under the trademark BLADE by Hitachi. The server 619 may be provided as a set of servers located on or off-site or both. The server 619 may be owned or provided as a service. The server 619 or the storage 613 may be provided wholly or in-part as a cloud-based resources such as Amazon Web Services or Google. The inclusion of cloud resources may be beneficial as the available hardware scales up and down immediately with demand. The actual processors—the specific silicon chips—performing a computation task can change arbitrarily as information processing scales up or down. In an embodiment, the server 619 includes one or a plurality of local units working in conjunction with a cloud resource (where local means not-cloud and includes or off-site). The server 619 may be engaged over the network 629 by the computer 625.

In the system 601, each computer preferably includes at least one processor coupled to a memory and at least one input/output (I/O) mechanism. A processor will generally include a chip, such as a single core or multi-core chip, to provide a central processing unit (CPU). A processor may be provided by a chip from Intel or AMD.

Memory can include one or more machine-readable devices on which is stored one or more sets of instructions (e.g., software) which, when executed by the processor(s) of any one of the disclosed computers can accomplish some or all of the methodologies or functions described herein. The software may also reside, completely or at least partially, within the main memory and/or within the processor during execution thereof by the computer system. Generally, each computer includes a non-transitory memory such as a solid-state drive, flash drive, disk drive, hard drive, etc. While the machine-readable devices can in an exemplary embodiment be a single medium, the term "machine-readable device" should be taken to include a single medium or multiple media (e.g., a centralized or distributed database, and/or associated caches and servers) that store the one or more sets of instructions and/or data. These terms shall also be taken to include any medium or media that are capable of storing, encoding, or holding a set of instructions for execution by the machine and that cause the machine to perform any one or more of the methodologies of the present invention. These terms shall accordingly be taken to include, but not be limited to one or more solid-state memories (e.g., subscriber identity module (SIM) card, secure digital card (SD card), micro-SD card, or solid-state drive (SSD)), optical and magnetic media, and/or any other tangible storage medium or media.

A computer of the invention will generally include one or more I/O device such as, for example, one or more of a video display unit (e.g., a liquid crystal display (LCD) or a cathode ray tube (CRT)), an alphanumeric input device (e.g., a keyboard), a cursor control device (e.g., a mouse), a disk drive unit, a signal generation device (e.g., a speaker), a touchscreen, an accelerometer, a microphone, a cellular radio frequency antenna, and a network interface device, which can be, for example, a network interface card (NIC), Wi-Fi card, or cellular modem.

The system 601 or components of system 601 may be used to perform methods described herein. Instructions for any method step may be stored in memory and a processor may execute those instructions, including use and training of a classifier for identifying cellular and/or non-cellular material.

The system 601 thus includes at least one computer (and optionally one or more instruments) operable to obtain one or more live cells isolated from a sample of a patient, wherein the one or more live cells comprise an immune cell. The system 601 is further operable to identify immune system function or dysfunction based on clinical data patterns predictive of immune-based diseases. In particular, clinical data from across a population is provided as input to a machine learning system of the system 601. The clinical data includes a training data set, which includes biomarker measurements (e.g., mass measurements) of immune cells collected from a plurality of patient samples, each having a known healthcare status (i.e., immunological function or disease and dysfunction). The machine learning system discovers associations in the training data and correlates healthcare statuses to biomarker measurement results. In particular, the machine learning system processes the training data set and discovers latent patterns that are predictive of an immunological status, including a stage or progression of a particular immunological disease or dysfunction, as well as treatments that are effective and ineffective. After repeatedly finding associations among data (i.e., immune cell mass measurements) across the population, the machine learning system learns the association and its correlation to healthcare status.

Accordingly, the methods of the present invention are useful in determining the immune system function and status of an individual. For example, the machine learning system is able receive patient data from an individual and identify an immunological function or dysfunction for the individual when the patient data presents one or more of the discovered associations. In particular, the patient data may include mass measurements of immune cells derived from a patient sample. Upon detecting that association among the patient data for the individual, the machine learning system further generates a report providing information related to the immune system evaluation, including, but not limited to, specific data associated with the patient sample having undergone testing, whether the patient's immune system is active or inactive, a determination of whether the patient's immune system is functional or dysfunctional, and a customized treatment plan tailored to an individual patient's immune system evaluation. The report may further provide predictive information, such as a prediction of risk of developing an immunological dysfunction.

In some instances, the subject may have a known stimulus and an investigator can determine whether an appropriate immune response is occurring by the subject's immune system. In other instances, the subject may be exhibiting symptoms requiring differential diagnosis, and the invention could be used to determine whether those symptoms are being caused by immunological activity. In other instances, the subject may not be exhibiting symptoms of immunological activity, but a known stimulus should have elicited such a response, and the invention might be used to determine whether immunological activity is taking place, though the subject may not be able to feel such effects.

In addition to assessing a patient's immune system response for subsequent diagnosis and treatment of a disease, the methods of the present invention may be useful in in identifying drug candidates and establishing vaccine efficacy. For example, in some embodiments, the methods of the present invention may be used in monitoring a patient's response to a stimulus (i.e., a drug, therapeutic, or vaccine), in which a change in mass of immune cells post administration of the stimulus can be used in determining efficacy of the stimulus.

As previously noted, the samples may include immune cells or cells related to some function or disorder of the immune system. Cellular components may be any building blocks that comprise the immune system, its signaling pathways, its activation cascades, or any other molecule that participates in the immune system or its diseases and disorders. These components may be proteins, nucleic acids, enzymes, intracellular fluid, or other components of a cell.

Cells of interest in certain embodiments of the invention may be selected from the group of immunologically active cells, including but not limited to leukocytes, lymphocytes, neutrophils, basophils, eosinophils, monocytes, mast cells, macrophages, dendritic cells, and natural killer cells.

In some embodiments, a sample is derived from a body fluid or tissue of the subject. Body tissue can be cells obtained from any organ of the body, including bone and bone marrow, lymph nodes, skin, lung, or any other tissue or organ. Fluid can be any bodily fluid excreted or obtained from within the subject, whether saliva, sputum, blood, lymph, cerebrospinal fluid, urine, feces, or other secretions or fluids. The sample may then be derived by laboratory processing that may include dilution, separation, centrifuge, or other manners of breaking the tissue or fluid into constituent cells or cellular components. The sample may be drawn from or given by the subject by any suitable means.

Incubation or culturing of the sample is not required by the invention. The invention may be able to utilize a smaller sample size compared to sample sizes necessary in traditional measurement methods such as optical measurement. For example, in the invention, the sample may comprise 500 or fewer cells. Samples may be taken ex vivo, from a living subject. Samples may also be taken postmortem.

In certain embodiments, the sample may require disaggregation before the cells or components are analyzed. Disaggregation may include physical or mechanical disaggregation, chemical disaggregation, proteolytic disaggregation, or any combination thereof. In some embodiments, proteolytic disaggregation is performed using one or more enzymes. Any suitable enzymes may be used. In some embodiments the tissue sample is washed with and digested by collagenase I and dispase II. Live cells may be washed into a fluidic tube or system with and supported by a suitable medium such as a Ham's nutrient mixture.

The cells or cellular components may be measured for their mass properties. Mass properties may include, but are not limited to, the mass of a cell or component at a given time, the average mass of a type of cell or component at a given time, the change in mass over time of a cell or component, the change in mass over time of an average of a type of cell or component, a rate of mass accumulation over time, the expected mass of a type of cell or component as compared to the sample from the subject, mass ratios of samples taken at different times, or from different subjects, or from different parts of the same subject, and the mass of cells or components that are stimulated, perturbated, or interacted with in some way. Mass properties can also be mass values for a given cell type or component type expected from like subjects to the subject itself. Clinical mass values may be the expected mass value for a certain cell or component based on clinically similar subjects or clinically similar samples, based on assumptions about the medical and immunological status of the subject. Mass accumulation rates (MAR) or mass changes are measured with a precision or error rate of about 0.01%. The mass accumulation rate or mass change is measured in about 20 minutes to two hours.

Instruments of the disclosure make sensitive and precise measurements of mass or a change in mass properties using an SMR or SMR array. The instruments use a structure such as a cantilever that includes a fluidic microchannel. Living cells are flowed through the structure, which is resonated and on which the frequency of resonation is measured. The frequency at which a structure resonates is dependent on its mass. By measuring the frequency at which the cantilever resonates, the instrument computes a mass property or change in mass property, of a living cell or component in the fluidic microchannel. Flowing of the cells or components through such devices allows observation of the functions of those cells or components, such as whether the samples are growing an accumulating or losing mass. Mass accumulation or loss or rate of mass accumulation or loss can be a clinically important property indicating immunological function or dysfunction.

Methods for measuring single cell growth are based on resonating micromechanical structures. The methods exploit the fact that a micromechanical resonators natural frequency depends on its mass. Adding sample to a resonator alters the resonator's mass and causes a measurable change in the resonant frequency. The SMR includes a sealed microfluidic channel that runs through the interior of a cantilever resonator. The cantilever itself may be housed in an on-chip vacuum cavity, reducing damping and improving frequency and thus mass resolution. As a cell and suspension flows to the interior of the cantilever, it transiently changes the resonant frequency of the cantilever in proportion to the buoyant mass of the cell. SMRs weigh single mammalian cells with a resolution of 0.05 pg (0.1% of a cell's buoyant mass) or better.

Precision of the invention in determining the mass of individual cells is much more precise than traditional measurement methods. For example, measurements using methods according to the invention are about 10 to 100 times more precise than measurements obtained using optical measuring techniques. This comparison can be seen clearly in FIG. 9. The rate of mass change of a single cell can be measured over two to four hours. The method includes producing a report that provides information about the sample. The method is made rapidly and does not require a separate culturing or enrichment step for the sample.

In some examples, sample preparation and dosing are performed on a single microfluidic chip. In some examples, sample preparation is performed on a sample preparation chip and dosing is performed on a dosing chip. Sample preparation may comprise positive isolation of the at least one living cell. In an example, the dosing chip comprises a dosing cartridge. The dosing cartridge comprises a panel of drugs, such as a panel of drugs specific to immunology, a panel of drugs specific to a stage of a disease, and a panel of drugs specific to a use. The dosing chip may comprise a plurality of reservoirs filled with a plurality of culture media, each culture media comprising a different treatment. In an example, the culture media and treatment are mixed with the at least one living cell at a specified time by controlling a valve on each reservoir. In some examples, the dosing chip comprises temperature control, pH control, and atmosphere control.

In a preferred embodiment, a measurement chip is used to measure mass properties. The measurement chip comprises an SMR chip. In an embodiment, measuring mass properties comprises flowing a queue of cells in a channel of the SMR back and forth through the SMR sensors. In an embodiment, measuring mass properties comprises flowing a queue of cells in a channel of the SMR through the SMR sensor. The chip comprising one or more SMR sensors may analyze multiple conditions concurrently. A plurality of chips, each chip comprising an SMR sensor, may be used to analyze multiple data points concurrently.

The method of the invention can analyze the sample without destroying the cells or cellular components. This may allow further testing of the sample after measurement using the invention. Living cells or active components may be extracted from a subject. The sample may be then flowed through the measurement instruments such as the SMR. The sample can be collected after flowing through the microchannels in the SMR. The sample need not be destroyed and may be available for further testing. This is an important aspect of the invention because immunological cells and components remain viable and can be further cultured, assayed, or otherwise studied. It also allows for repeat studies of the cells or components to see if there are further changes over a longer period than the time during which the sample is processed by the SMR.

Obtaining mass property and analysis measurements using the present invention may be possible with only minimal use of culture medium. Long term cell culturing, passaging, or applying long term drug pressure is not required. Instead, the invention may use cell culture medium only for the duration of the analysis. Estimated preparation time from the start of sample delivery may be less than one hour and treatment and analysis of the sample could take three to five hours. The speed at which the invention may be operated is a useful advantage over other cellular analysis methods. Culturing the cells to determine their activity can take days, increasing the utility of the claimed method.

In certain embodiments, the measurement instrument may include sample preparation, treatment, if any, and measurement components in a single instrument. In other embodiments, the sample preparation, treatment, and measurement components may be performed in different measurement instruments.

The sample may be obtained then delivered to the instrument in a suitable container such as a microcentrifuge tube. The sample may be then introduced onto the measurement instrument which measures the mass properties of the individual cells or components in the sample.

The function of the immune system can be described as an expected response to a given stimulus. Dysfunction of the immune system is an unexpected response to the same stimulus, or a response in the absence of a stimulus. Normal function of the immune system may be indicative of health or of the competency of the body to respond to the stimulus. Dysfunction may be indicative of one or more immunological defects, including but not limited to autoimmune disorders, hypersensitivity reactions, immunodeficiency, or an overwhelming of the subject's immunological capabilities.

The sample may be administered an immunological stimulus to determine the effects of that stimulus on the sample or the subject itself. The immunological stimulus may take the form of many challenges administered to the subject or the sample. Changes in physical characteristics such as heat, light, or the fluid surrounding the sample or subject may be an immunological stimulus.

In other embodiments, the stimulus can be the administration of a microbiological sample, such as bacteria, virus, fungi, or helminthic pathogens that may be expected to or that it would be advantageous to elicit an immune response. Stimulation of immune cells with such pathogens could allow investigators to determine which parts and pathways of the immune system are activated in response to that pathogen, better enabling treatment of infectious disease. For example, introducing fungi such as aspergillus to a sample could help to determine whether the subject's immune system is able to respond adequately to that fungus, and thereby guide treatment decisions for the subject itself or a subject infected with a similar pathogen.

In other embodiments, the stimulus can be derived from biological sources, such as venoms, pollens, secretions, tissues, antibodies, toxins, and other small-molecule, non-biologically derived sources or other chemical or biological products. The immunological stimulus can also be chemical substances. These non-biological stimuli may act as antigens and could allow investigators to determine which parts and pathways of the immune system are activated in response to that antigen. For example, introducing different types of pollens to a subject with seasonal allergies could yield samples demonstrating whether the subject's immune system responds to that pollen. In another example, administration of an antigen that causes a hypersensitivity reaction in a subject, such as bee venom, could allow an investigator to determine the rate and extent of the immunological response to that stimulus, such that more information about the hypersensitivity reaction might be known and thus the potential for morbidity and mortality for subjects with a known hypersensitivity to such an antigen.

In some embodiments, the invention can be used to determine the mass properties of certain antibodies. Antibodies are proteins produced by the body produced by immune cells that interact with what the immune system has identified as a potential foreign body or threat. Antibodies may take the form of immunoglobulins, including IgA, IgD, IgE, IgG, and IgM. The whole immunoglobulin or a functional fragment, or useful piece of that immunoglobulin, may be measured by the invention. Such immunoglobulins are produced by the body in response to antigens, a potential foreign body or threat. The measurement of the mass properties of immunoglobulin cellular components is a useful tool for measuring immunological status, where some antigen has activated the antibody-mediated immune system.

In some embodiments, the invention comprises the correlation of mass properties of a sample or representative samples and health outcomes. The correlated health outcomes are the healthcare treatments or diagnoses that can be measured against immunological samples' mass properties. Health outcomes may relate to but are not restricted to the presenting diagnosis of the subject. Health outcomes may include infection, immunodeficiency, autoimmune disorders, hypersensitivity disorders, amongst other immunological changes resulting in disease or dysfunction.

In some embodiments, the invention may comprise the correlation of mass properties of a sample or representative samples and health outcomes. The correlated health outcomes may be the healthcare treatments or diagnoses that can be measured against immunological samples' mass properties. Health outcomes may include but are not limited to the presence or absence of and including but not limited to autoimmune disorders, immunodeficiency, the presence or absence of infection, or a hypersensitivity reaction. In such outcomes, the mass properties of given cells and components may be associated with disease processes, normal immune response, or the effectiveness of treatment of one of those disease properties.

Within this invention, an algorithm may be designed to note mass properties from specified samples from specified subjects and the health outcomes that those subjects are experiencing or have experienced. The algorithm could denote a correlation coefficient between health outcomes such as those described above, and the mass property is measured by the invention. The algorithm could then note to the user of the invention that the mass properties having been measured by the invention were correlated by said algorithm two other subjects with similar mass properties that had specified health outcomes.

In some embodiments, this invention may be used to measure cytokines. Cytokines are proteins secreted by cells, and therefore cellular components as described above. Cytokines are used in the body as signaling proteins; their excretion by cells attempts to activate or deactivate another cell's function. Cytokines may be used in hormonal regulation as well as immune modulation. A cytokine storm is a sudden release of an overload of cytokines that overwhelms the body's normal immune response; it can lead to fever, organ system failure, coma, and death. The invention can be used to measure mass properties of cells and cellular components such that a cytokine storm could be identified or ruled out as a cause of symptoms in a given subject. Alternatively, the invention may be used to determine whether an immunological stimulus may lead to a cytokine storm by testing that stimulus on the sample or subject, and measuring for a change in the mass properties of cells or components such that the cytokine storm is detected or not.

In some embodiments, the invention may be used to test a vaccine candidate. A vaccine is an antigenic stimulus administered to a subject such that the immune system recognizes the stimulus as pathogenic. Upon re-challenge by the actual disease, a useful vaccine has potentiated the immune system to be able to recognize the antigen as pathogenic and thus mount an appropriate immune response more quickly, preventing the disease, or fulminant symptoms thereof. Vaccine candidates can be a potentially pathogenic organism or part thereof, such as a protein, toxin, excretion, or nucleic acid associated with or constituent of that organism. A vaccine candidate that elicits an immune response in a sample may be useful in determining whether a sample has been previously treated with that vaccine or not, or whether that vaccine candidate would be able to elicit an immune response in the subject or like subjects. The immune response would be measured as a change in the mass properties of the immune cells or components after exposure to the vaccine candidate antigen.

In some embodiments, the invention may be used to evaluate CAR-T cell therapy. CAR-T cell therapy referees to chimeric antigen receptor T-cell therapy. T-cells, a type of lymphocyte, are extracted from the subject or an equivalent subject. They are then treated with chimeric antigen receptors, a biological engineering process that enables the T-cell to identify cells for destruction by the immune system's mechanisms for antigen-mediated response. The T-cell is administered to the subject so that it can identify its targets in vivo. CAR-T is used to enable the body to destroy cancer cells by training the T-cell to flag the cancer cell as dangerous and in need of destruction.

The invention may allow evaluation of whether administration of CAR-T cell therapy to a sample or subject has been effective. The invention may allow evaluation of whether cells or components respond to potential chimeric antigens. Antigen testing on samples may be a useful method of determining whether an immunological response is elicited by that type of antigen. CAR-T therapy may be used for hematological cancers as well as solid organ cancers because it activates the immune system against the cancer cells. That activation may be measured by the invention, where the mass properties of the immune cells or components demonstrate an active immunological state in the presence of or after the introduction of the oncological stimulus.

In some embodiments, the invention may be used to evaluate cell-based therapy. In cell-based therapy, certain of a subject's cells are removed from the subject, treated with the object of changing the nature of the subject's cells, and then returning the cells to the subject with the change, hopeful that the subject will respond to the change in the treated cell. The treated cells may be immunologically active or activated, and the resultant changes in immune status can be measured by the invention. The invention may also be used to test whether that cellular change is effective prior to administering to subjects. The invention may also test whether treated cells are responding to stimuli in the expected manner. For example, a subject with an aplastic anemia may be treated with cell-based therapy to stimulate new bone marrow growth and thus the production of blood cells. The subject's bone marrow cells could be tested by the invention for whether the therapy has worked before returning the cells to the subject's bone marrow. If the cell therapy has been successful, the mass properties of those immune cells may have returned to be within clinically normal values or greater than the subject's previous values.

In some embodiments, the invention may be used to measure a hypersensitivity response. Hypersensitivity reactions occur when the immune system has dysfunctional response disproportionate to the antigen presented to the body. Some are immediate anaphylactic reactions while others more slowly develop into other disease states. The invention can be used to determine whether a subject or a sample from the subject responds with a hypersensitive response to the stimulus, or whether the subject or sample responds normally to that stimulus. For example, a subject that alleges a hypersensitive response to a drug could have a sample drawn. Stimulation of the sample with the drug that caused the first reaction could be used to determine whether the immune system is mounting an immunological response to that medication, or whether the first reaction was caused by other sources. Measurement of the mass properties of the sample may allow an investigator to know whether the sample is exhibiting an immunological response, such as immunoglobulin or cytokine release in response to that drug, by monitoring changes in the mass properties of the cell or components within the invention.

In some embodiments, the invention may be used to measure the effectiveness of immune modulation. Immune modulation is the up or down regulation of the immune system in order to activate the immune system or prevent the subject's immune system from eliciting its normal response. Immune modulation, up or down regulation, can be measured by the invention. Samples drawn from a subject can be evaluated for the activation or deactivation of cells or components of the immune system in accordance with the immune modulation expected for that subject. For example, after transplanting whole organs from a foreign organism, the immune system must be suppressed to prevent the rejection of the foreign organ; this is a down regulation-type immune modulation. The invention might be used to measure whether the subject's immune system is sufficiently downregulated using medication therapy to have a low likelihood of rejection. By measuring whether the mass properties of the subject's cells or components are lower than clinical normal limits, or lower than the subject's previous values, an investigator could determine whether the immunological status of the subject is sufficiently modulated.

In a further example, the invention may be used to advantage in evaluating a subject with an immunodeficiency disorder; that is where the immune system fails to respond adequately to a given stimulus. Frequently after a chemotherapy regimen, a subject will have greatly inhibited immunologic capabilities because of the cytotoxic effects of the chemotherapy. In such subjects, the immune system might be upregulated by giving exogenous immunoglobulins, colony stimulating factor, or other immunologic adjuvants or stimulants. The invention could be used to evaluate whether such up-regulation type immune modulation has been or might be effective on a subject with immunodeficiency by measuring whether the mass properties of that subject's cells or components have returned to values within normal clinical limits, or to the subject's own previous levels.

In some embodiments, the invention may be used to evaluate for the presence of an autoimmune disorder. Autoimmune disorders are a class of immune dysfunction in which the subject's immune system has upregulated without the presence of an external stimulus. The immune system has identified some aspect of the subject's own body as requiring an immunological response, leading to some activation of the immunological cascade, such as by the release of interleukins, tumor necrosis factor, or other immunological signaling paths. By measuring mass properties of a subject's cells or components, diagnosis and treatment of autoimmune disorders can be assisted with the invention.

Furthermore, the effectiveness of a treatment for an autoimmune disorder might also be tested with the invention. A subject with an autoimmune disorder might be administered a potential treatment for the condition. A sample from that subject could be evaluated with the invention to determine whether the treatment has successfully prevented immunological activity that was causing the autoimmune disorder.

Figure 7:
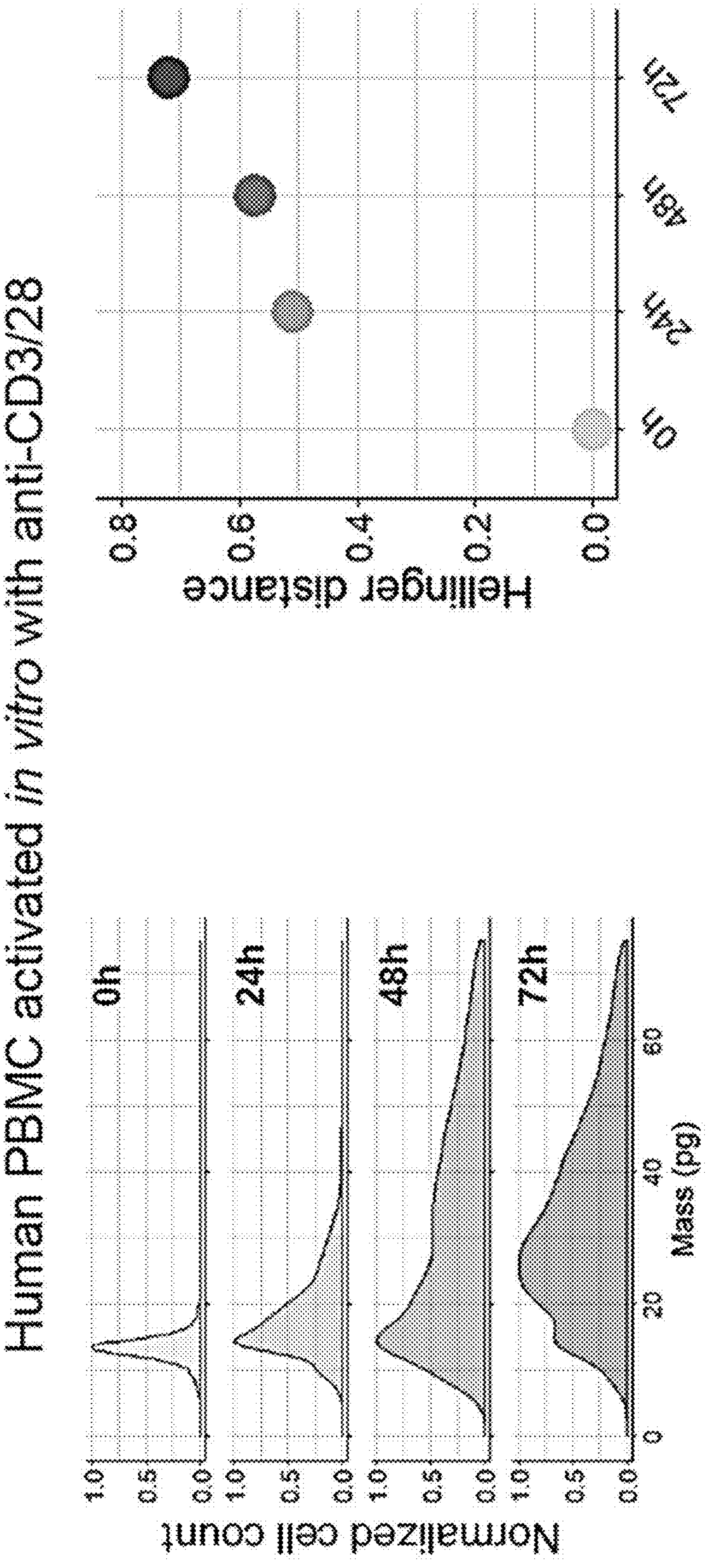
FIG. 7 shows graphs characterizing T cell activation with single cell mass measurements.

FIG. 7 shows graphs characterizing T cell activation with single cell mass measurements. The time course (graphs on the left) reveals a significant increase in cell mass during early immune cell activation. This manifests as an increase in Hellinger distance relative to the 0 h cell population over the course of activation (graphs on the right).

Figure 8:
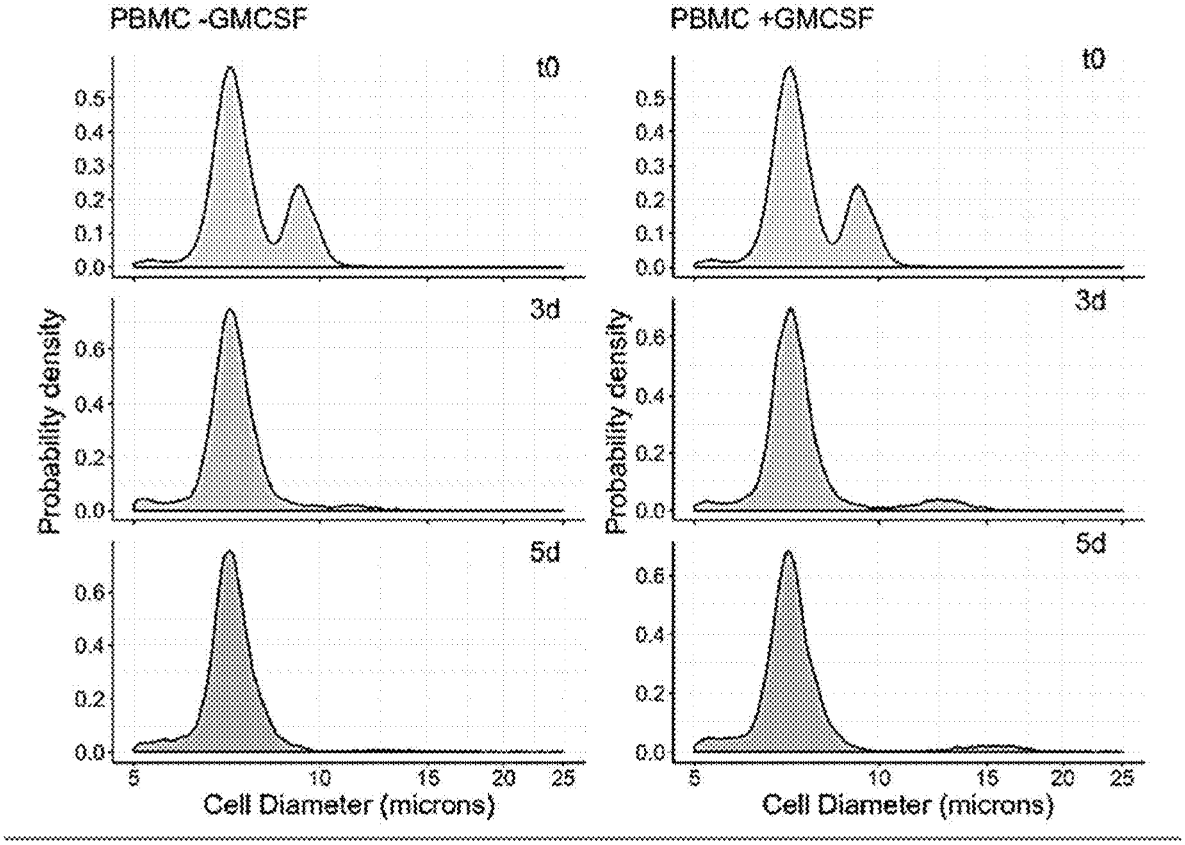
FIG. 8 shows graphs illustrating differences in peripheral blood mononuclear cell (PBMC) cell diameter over time.

FIG. 8 shows graphs illustrating differences in peripheral blood mononuclear cell (PBMC) cell diameter over time used in measuring T cell suppression. In order to measure T cell suppression, GM-CSF (granulocyte-macrophage colony-stimulating factor) treatment was used to mimic immunosuppressive microenvironment induced by myeloid derived suppressor cells (MDSC). Peripheral blood mononuclear cells (PBMC) were isolated from fresh whole blood and plated with or without GM-CSF for 5 days. Measurements of cell diameter (Coulter counter) were collected during GM-CSF incubation prior to activation. After 5 days of culture, PBMC were activated and single cell mass measurements (via SMR) and cell diameter measurements were collected at 6, 12, and 24 h after activation. As illustrated in the graphs, populations of smaller lymphocytes and larger monocytes are present at to. After extended culture, most monocytes appear to remain stuck to high bind plate as seen by significantly reduced number of large cells. The small number of monocytes that are measured show an increased size in response to treatment with GM-CSF.

Figure 9:
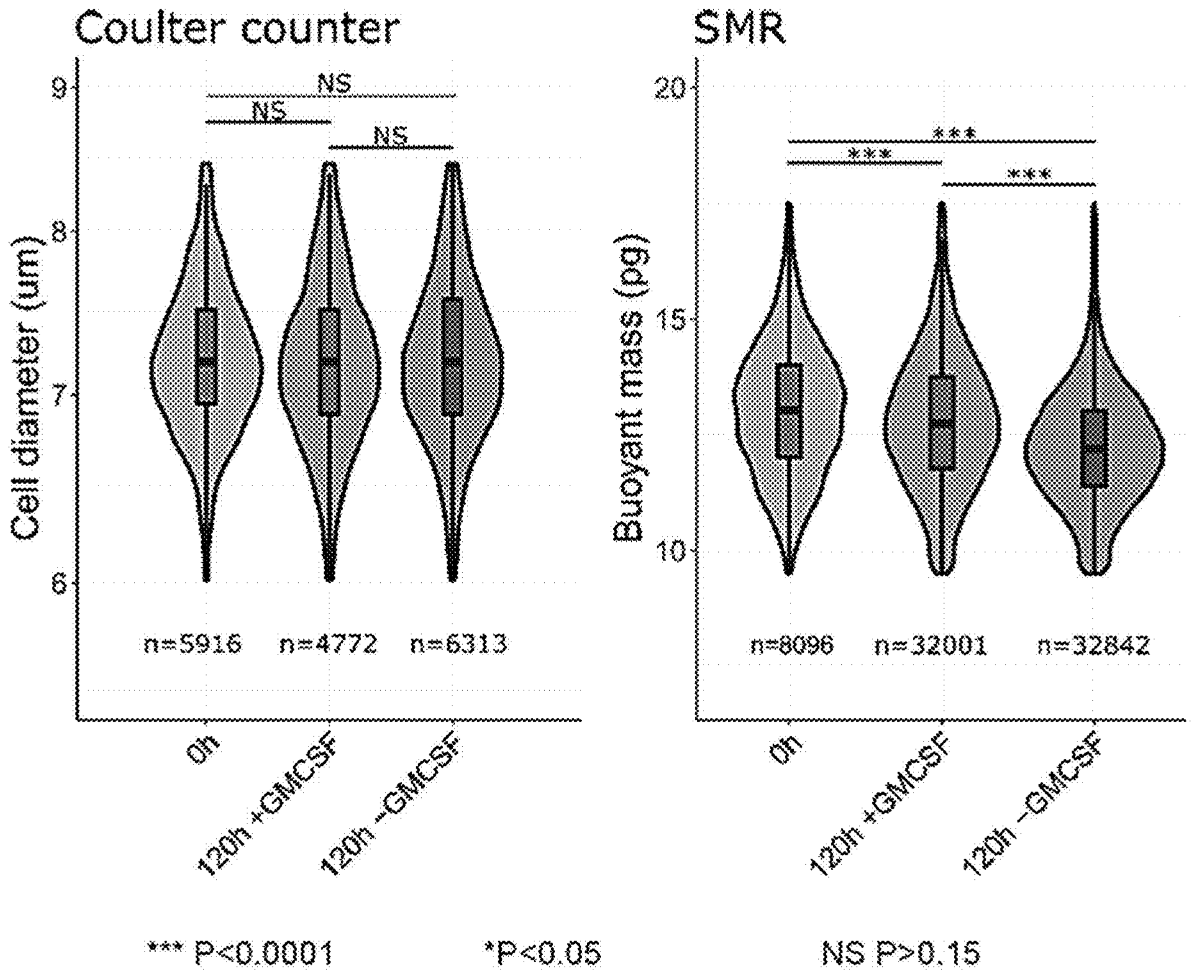
FIG. 9 shows graphs illustrating Coulter-based measurements vs. single-cell mass measurements obtained via the SMR for determining lymphocyte dysfunction induced by GM-CSF treatment.

FIG. 9 shows graphs illustrating Coulter-based measurements vs. single-cell mass measurements obtained via the SMR for determining lymphocyte dysfunction induced by GM-CSF treatment. As illustrated, Coulter-based measurements do not reveal any significant differences in cell diameter over time as a result of GM-CSF treatment. Higher resolution single cell mass measurements collected with the SMR show that lymphocytes from PBMC treated with GM-CSF have a significantly higher buoyant mass than lymphocytes from PBMC without GM-CSF.

Figure 10:
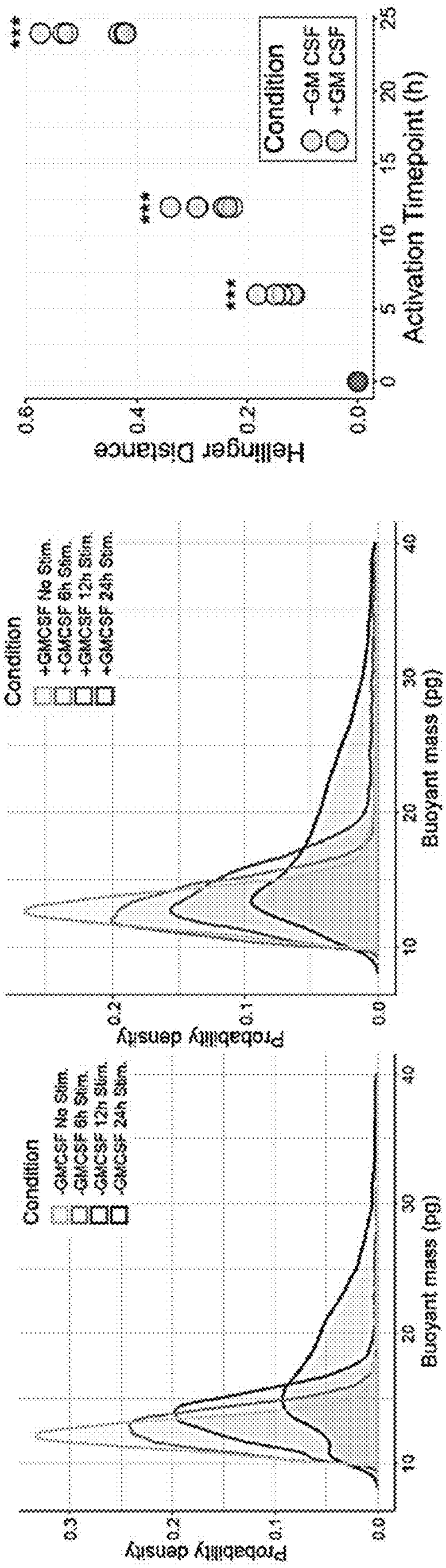
FIG. 10 shows graphs illustrating differential lymphocyte activation between PBMC cultured with and without GM-CSF.

FIG. 10 shows graphs illustrating differential lymphocyte activation between PBMC cultured with and without GM-CSF. Both lymphocyte populations demonstrate an increase in buoyant mass in response to stimulation with activation cocktail. However, lymphocytes treated with GM-CSF show a less significant increase in mass in response to activation (higher Hellinger distance indicates a more significant shift in mass distribution relative to population measured at t0). This divergence in activation dynamics between the +/GM CSF conditions is significant as early as 6 h after activation.

Figure 11:
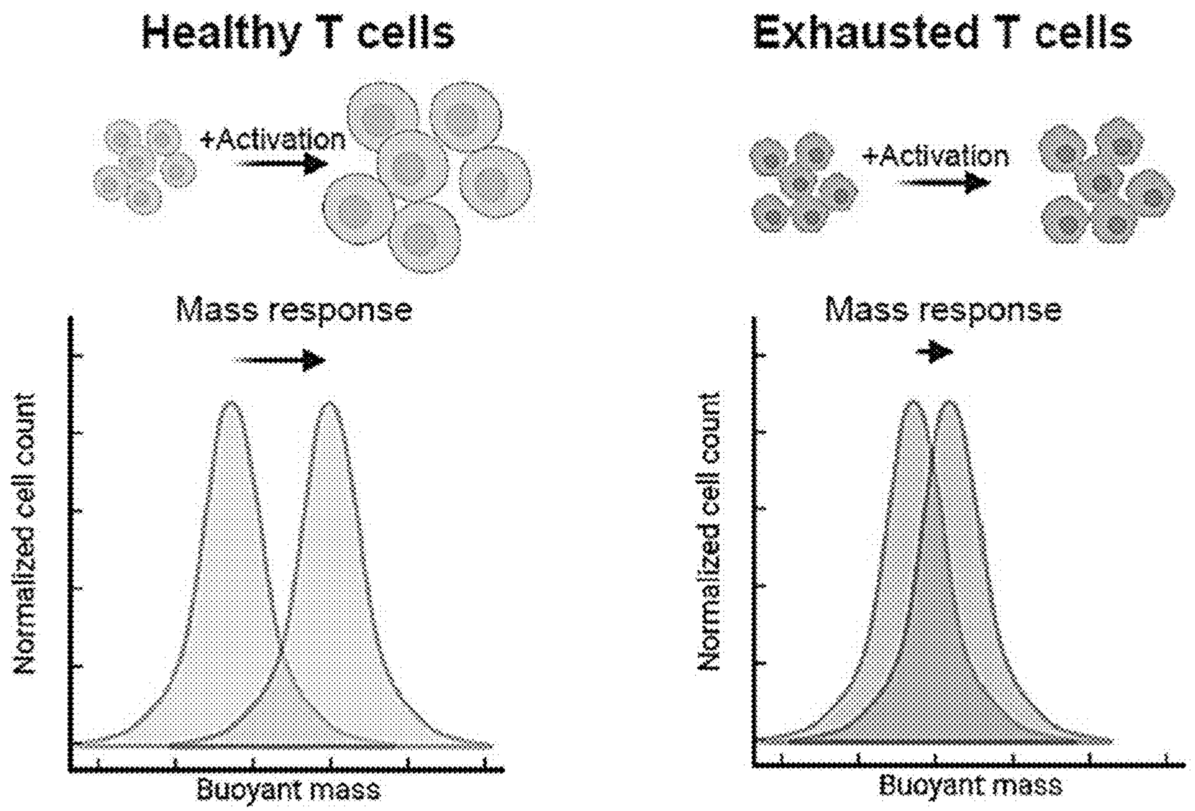
FIG. 11 shows graphs illustrating buoyant mass changes in both healthy T cells and exhausted T cells in response to activation.

FIG. 11 shows graphs illustrating buoyant mass changes in both healthy T cells and exhausted T cells in response to activation. In response to activation, healthy T cells display a rapid and significant increase in buoyant mass. For exhausted T cells, these activation processes are blunted. Cell mass measurements can therefore be used as a biomarker to quantify the functional deficiencies associated with exhaustion.

Figure 12:
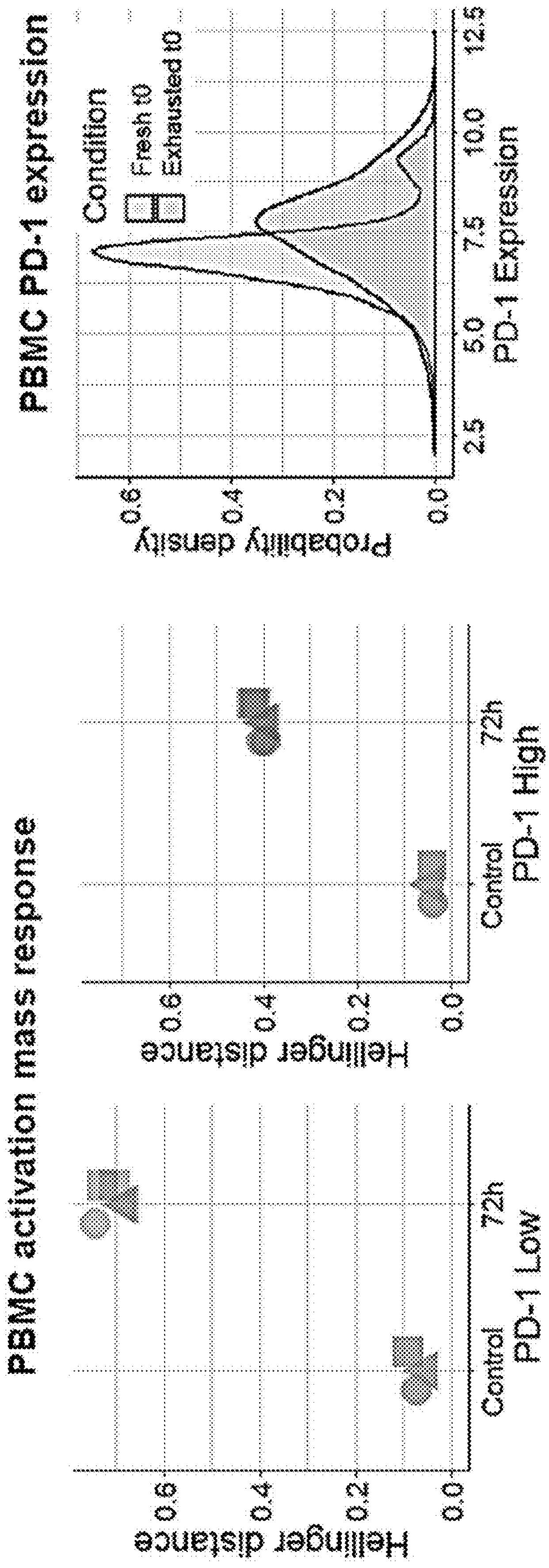
FIG. 12 shows graphs characterizing T cell exhaustion.

FIG. 12 shows graphs characterizing T cell exhaustion. An exhausted T cell phenotype was induced with continuous re activation in vitro. Phenotype was verified with flow cytometry demonstrating increased PD-1 expression after repeated stimulation. Exhausted cells displayed a less significant mass increase in response to activation when compared to freshly isolated PBMC, a biophysical single cell signature associated with dysfunctional T cell state.

Figure 13:
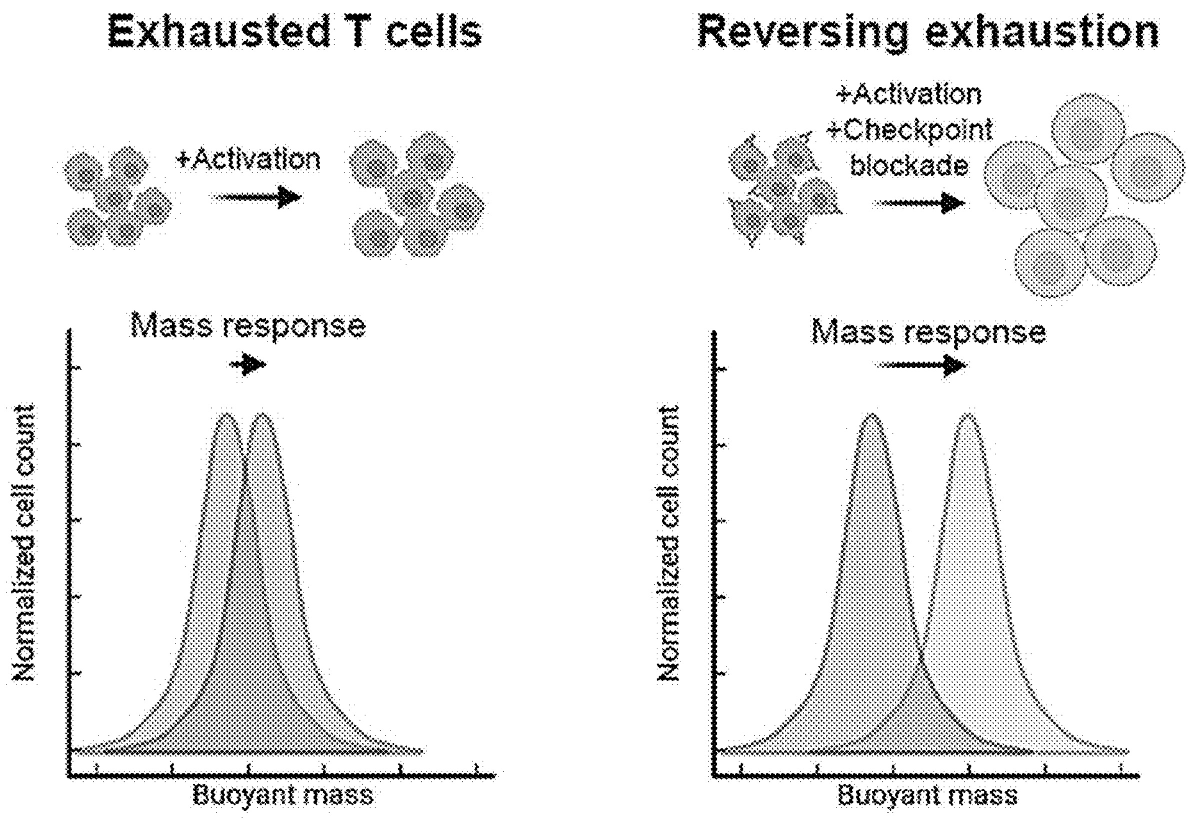
FIG. 13 shows graphs illustrating buoyant mass changes in exhausted T cells in response to activation and buoyant mass changes as a result of reversal of exhaustion via a checkpoint blockade.

FIG. 13 shows graphs illustrating buoyant mass changes in exhausted T cells in response to activation and buoyant mass changes as a result of reversal of exhaustion via a checkpoint blockade. Checkpoint blockade is meant to reverse exhaustion and reestablish the activation potential and function of T cells. The reversal of exhaustion manifests as an increased mass response to activation in the presence of checkpoint inhibitors. Cell mass can therefore be used as a quantitative readout for monitoring functional response to checkpoint blockade.

Figure 14:
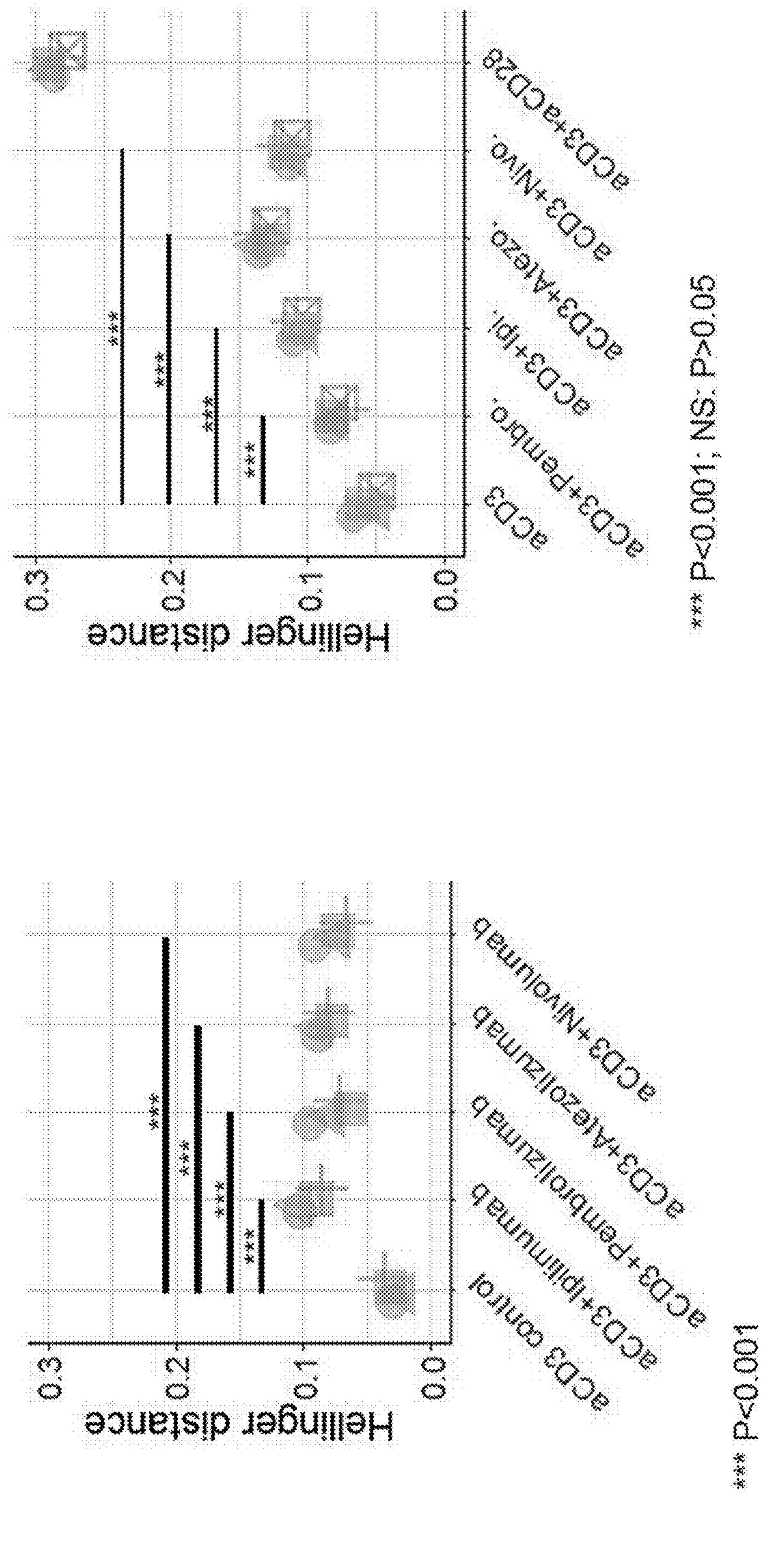
FIG. 14 shows graphs illustrating cellular mass response to checkpoint inhibition.

FIG. 14 shows graphs illustrating cellular mass response to checkpoint inhibition. The graph on the left illustrates mass response to checkpoint inhibition. Healthy donor PBMC activated with anti CD3 for 96 h in the presence or absence of anti CTLA 4 (Ipilimumab), anti PD 1 (Pembrolizumab, Nivolumab), anti PD L1 (Atezolizumab), Higher Hellinger distances for drug treated populations indicates a more significant degree of T cell activation as compared with anti CD3 alone. Significant mass responses to three commonly used checkpoint inhibitor mechanisms. Suggests utility of using single cell biophysical measurements for label free assessment of immunotherapy drug response. The graph on the right illustrates mass response in immune cells isolated from lung cancer pleural effusion. Pleural effusion specimen (including immune cells and malignant cells after RBC lysis) was treated with Pembrolizumab, Ipilimumab, Atezolizumab, or Nivolumab and stimulated with anti CD3 for 72 h. Anti CD28 serves as a positive control for T cell activation independent of microenvironment. Increased Hellinger distance with checkpoint inhibition treatment suggests that activation was more significant than anti CD3 stimulation alone. Mass response signatures will be compared with clinical outcome data to determine utility as a biomarker for predicting response to checkpoint inhibitors.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

EQUIVALENTS

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

The invention claimed is:

1. A method for determining the efficacy of cell-based therapy, the method comprising the steps of:

measuring mass of one or more immune cells or immune components from a subject prior to administering a cell therapy to the subject;

administering the cell therapy to the subject;

measuring mass of one or more immune cells or immune components from the subject after the administering step; and determining efficacy of the cell therapy based on said measuring step by comparing the measured masses, wherein the measuring is performed using a device comprising a suspended microchannel resonator (SMR).

2. The method of claim 1, wherein the determining step comprises identifying the current presence or future risk of cytokine release syndrome in the subject based on a change in the measured masses.

3. The method of claim 1, wherein the cell therapy is CAR-T cell therapy.

4. The method of claim 1, wherein said SMR comprises a series of cantilevered resonators in fluid communication via a plurality of microfluidic channels.

* * * * *